(12) United States Patent
Polnisch

(10) Patent No.: US 10,850,210 B2
(45) Date of Patent: Dec. 1, 2020

(54) PRODUCTION WATER DESALINIZATION VIA A RECIPROCAL HEAT TRANSFER AND RECOVERY

(71) Applicant: Fred Polnisch, Baytown, TX (US)

(72) Inventor: Fred Polnisch, Baytown, TX (US)

(*) Notice: Subject to any disclaimer, the term of this patent is extended or adjusted under 35 U.S.C. 154(b) by 41 days.

(21) Appl. No.: 15/468,449

(22) Filed: Mar. 24, 2017

(65) Prior Publication Data
US 2018/0272246 A1   Sep. 27, 2018

(51) Int. Cl.
| | | |
|---|---|---|
| *B01D 1/26* | (2006.01) |
| *B01D 1/28* | (2006.01) |
| *B01D 5/00* | (2006.01) |
| *C02F 1/04* | (2006.01) |
| *B01D 17/02* | (2006.01) |
| *B01D 17/04* | (2006.01) |
| *B01D 1/00* | (2006.01) |
| *C02F 103/10* | (2006.01) |
| *C02F 1/16* | (2006.01) |
| *C02F 1/40* | (2006.01) |

(52) U.S. Cl.
CPC ............. *B01D 1/26* (2013.01); *B01D 1/0088* (2013.01); *B01D 1/28* (2013.01); *B01D 5/0003* (2013.01); *B01D 5/006* (2013.01); *B01D 5/0012* (2013.01); *B01D 5/0039* (2013.01); *B01D 17/0208* (2013.01); *B01D 17/042* (2013.01); *B01D 17/045* (2013.01); *C02F 1/048* (2013.01); *C02F 1/16* (2013.01); *C02F 1/40* (2013.01); *C02F 2103/10* (2013.01); *C02F 2303/10* (2013.01); *Y02P 70/34* (2015.11)

(58) Field of Classification Search
CPC . B01D 1/26; B01D 5/00; B01D 17/02; B01D 17/04; B01D 17/042; B01D 17/045; C02F 1/04
See application file for complete search history.

(56) References Cited

PUBLICATIONS

Linnhoff, B. et al. (1978) AIChE Journal, 24, 4, 633-642.*

* cited by examiner

*Primary Examiner* — Brian A McCaig
(74) *Attorney, Agent, or Firm* — Lyman Moulton, Esq.

(57) ABSTRACT

A system for brine water desalinization includes a first heat exchanger having an inlet plenum and an outlet plenum for a first fluid comprising a concentrate in a liquid. The first heat exchanger includes a shell side fluid inlet and a shell side fluid outlet for a second fluid comprising a higher concentrated liquid than the first fluid. The system also comprises pipes configured to direct the first fluid from the outlet plenum to a shell side fluid inlet of a second heat exchanger and to direct the second fluid from the shell side fluid outlet to an inlet plenum of the second heat exchanger. The system further includes pipes configured to produce desalinized water by a serial distillation of multiple steams from an nth number of heat exchangers into respective distillates thereof and a parallel product of brine waste thereof from the heat exchangers.

20 Claims, 5 Drawing Sheets

PRODUCTION WATER DESALINIZATION VIA A RECIPROCAL HEAT TRANSFER AND RECOVERY

BACKGROUND AND FIELD OF INVENTION

The invention relates generally to the cleaning and desalination of water, and in a particular though non-limiting embodiment to systems, methods and means for cleaning and desalinating production water obtained from an oil or gas well.

Oil pumped from a well is not produced in a pure form; rather, it is typically mixed with a brine solution. Accordingly, this solution is usually called production water. Subsequent treatment in a separation and storage tank unit separates the oil from the brine, primarily due to a difference in their respective densities. Consequently, oil is usually separated toward the top of the unit because it is lighter, whereas the brine tends to accumulates toward the bottom of the unit because it is heavier.

The oily brine disposal process is frequently a complicated and expensive operation. For example, the oily brine can only be disposed of at regulatory approved sites, which are sometimes located far from the well site. The cost of oily brine is therefore relative to the distance of the well site from the disposal site. An alternative approach, therefore, is to desalinate the brine water as much as possible, so that less waste product needs to be transported to storage sites.

Current desalination methods primarily include reverse osmosis, and evaporation. Evaporation can be achieved in many different ways, for example, using multi steam flash units; multiple effect evaporators; vapor compression evaporators; and a combination of multiple effect evaporators and vapor compression evaporators of various arrangements. These approaches can, depending on system design and operation requirements, comprise a variety of either single stage evaporation effects and/or or multiple evaporation effects.

In multiple-effect evaporation, a single steam energy source is used to produce steam in a plurality of evaporators, applying a cascade of pressures and temperatures from one effect to the next. Feed flow is run in either a series concurrent flow or counter flow toward the steam flow. In either case, the concentration of the brine increases toward the direction of the flow.

Ordinarily, skilled artisans will appreciate that the higher the salt concentration in the production water being desalinated, the higher the resulting viscosity of the fluid; thus, higher heat transfers resistance as well as a pressure drop through the heat exchanger. A selection of the specific type of desalination system will be dictated by the cost of operations, and especially the cost of fuel; in most cases, however, the use of evaporation technology is effectively negated by the prohibitive costs of fuel or energy.

There is, therefore, a longstanding but unmet need for a simple and efficient productions water desalination unit and methods of operating the same that overcome the inefficiencies and limitations of the existing prior art.

SUMMARY OF THE INVENTION

A system for the reciprocal heat transfer and recovery of production water desalinization as disclosed includes a first heat exchanger comprising an inlet plenum and an outlet plenum for a first fluid comprising a concentrate in a liquid. The first heat exchanger includes a shell side fluid inlet and a shell side fluid outlet for a second fluid comprising a higher concentrated liquid than the first fluid. The system also comprises a first plurality of pipes configured to direct the first fluid from the outlet plenum to a shell side fluid inlet of a second heat exchanger and to direct the second fluid from the shell side fluid outlet to an inlet plenum of the second heat exchanger. The system further includes a second plurality of pipes configured to produce desalinized brine water by a serial distillation of multiple steams from an nth number of output plenums of an equal number of heat exchangers into respective distillates thereof and a parallel product of brine waste thereof from the heat exchangers.

A method for brine water desalinization including reciprocal heat transfer or exchange and recovery is also disclosed. The method includes providing 210 a first heat exchanger comprising an inlet plenum and an outlet plenum for a first fluid comprising a concentrate in a liquid, the first heat exchanger also comprising a shell side fluid inlet and a shell side fluid outlet for a second fluid comprising a higher concentrated liquid than the first fluid. The method also includes providing 220 a first plurality of pipes configured to direct the first fluid from the outlet plenum to a shell side fluid inlet of a second heat exchanger and to direct the second fluid from the shell side fluid outlet to an inlet plenum of the second heat exchanger. The method additionally includes producing 230 a desalinized brine water via the first and second heat exchangers and the first plurality of pipes and a second plurality of pipes by a serial distillation of multiple steams from an nth number of output plenums of an equal number of heat exchangers into respective distillates thereof and a parallel product of brine waste thereof from the heat exchangers. The method further includes providing 240 providing a third plurality of pipes configured to direct the first fluid from the shell side fluid outlet of the second heat exchanger to an inlet plenum of a third heat exchanger and to direct the second fluid from the outlet plenum of the second heat exchanger to the shell side fluid inlet of the third heat exchanger.

Other aspects and advantages of embodiments of the disclosure will become apparent from the following detailed description, taken in conjunction with the accompanying drawings, illustrated by way of example of the principles of the disclosure.

Figure 1:
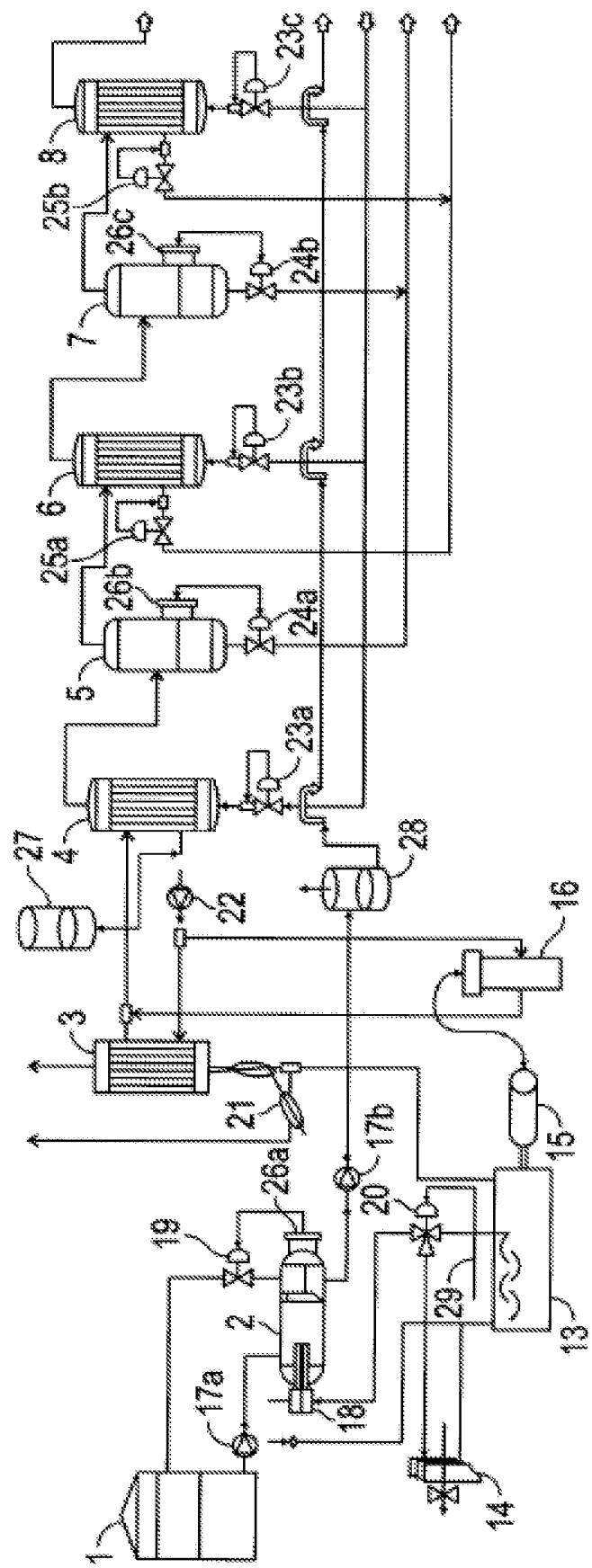
FIG. 1 is a schematic representation of a first example embodiment of the invention, in which components and processing structure are emphasized in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure, use of the term 'cavitation' refers to the rapid formation and collapse of bubbles in water vortex caused by an impeller moving the water between a larger cylinder and a smaller cylinder to ports in the smaller cylinder. The use of the term 'vortex' refers to a whirling mass of water that draws the water and everything therein towards its center. Therefore, the elongated vortex as disclosed herein extends from the impeller to the ports and creates a cavitation path within the elongated vortex.

The present invention greatly reduces the cost of production water disposal by evaporating water from the brine, thereby significantly decreasing the volume. The product distillate can then be disposed of safely, and subsequently used for irrigation and other applications. The distillate can even be processed and converted into potable drinking water.

The desalination process disclosed herein is essentially a thermal multiple effect evaporation process, which uses cascading steam pressures and temperatures to produce various effects. One unique feature of the system is the ability to recover waste heat from an associated internal combustion engine. The process differs from conventional evaporation units in many ways, for example, by using a parallel feed rather than series forward flow or series counter flow. The series feed flow in either concurrent flow or counter flow toward the steam flow may also be used depending on the specific application and optimization.

For ease of understanding, an example process flow for a three-effect evaporator with parallel feed is shown and described, though those of ordinary skill in the art will readily appreciate that evaporators comprising series feed and more than three effects will also fall within the spirit and scope of the instant disclosure.

Figure 2:
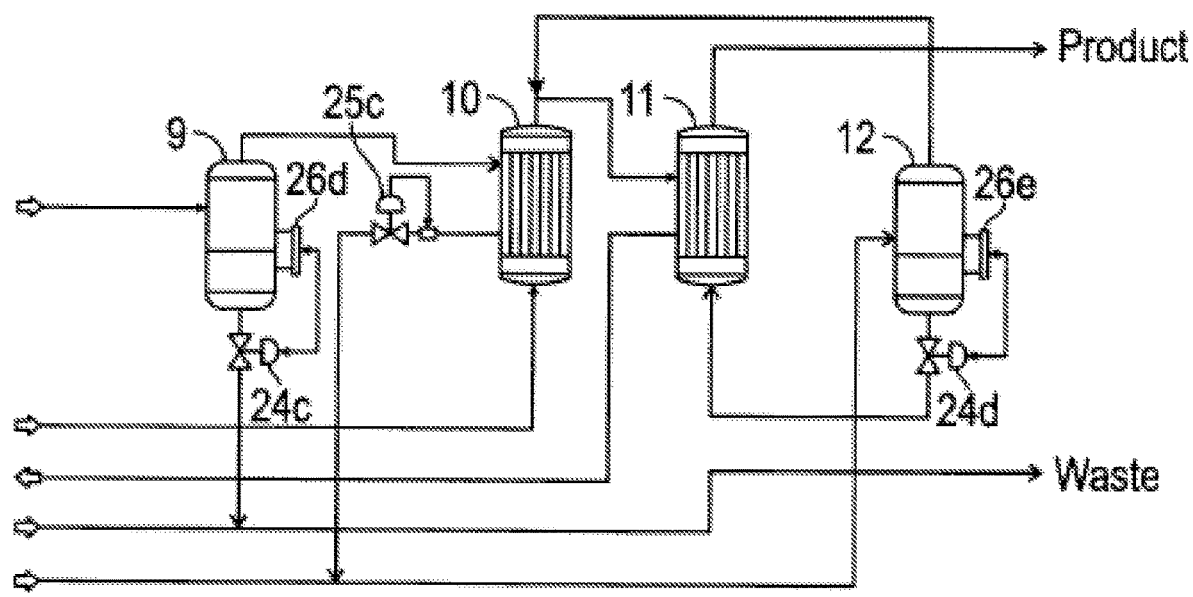
FIG. 2 is a continuation schematic representation of the first example embodiment of the invention, in which components and processing structure are emphasized in accordance with an embodiment of the present disclosure.

FIG. 1 and FIG. 2 schematically representation a first example embodiment of the invention, in which components and processing structure are emphasized in accordance with an embodiment of the present disclosure. Equipment and instrumentation consistent with presently contemplated commercial embodiments may be found in Table 1 below, though again, ordinarily skilled artisans will appreciate that this listing is for illustrative purposes only, and is not intended to limit the scope of the disclosure or similar or equivalent structures and systems. For example, in one specific though non-limiting embodiment, both an evaporator and a separator can be combined within a single kettle type unit, etc.

Basic List of Equipment and Instruments

TABLE 1

| Tag No. | Description |
| --- | --- |
| 1 | Oil - Brine Separation/Storage Tank |
| 2 | Oil-Brine Two Phase Separator Drum |
| 3 | Exhaust Heat Recovery Heat Exchanger |
| 4 | First Effect Evaporator/Heat Exchanger |
| 5 | First Effect Brine Steam Separator |
| 6 | Second Effect Evaporator/Heat Exchanger |
| 7 | Second Effect Brine Steam Separator |
| 8 | Third Effect Evaporator/Heat Exchanger |
| 9 | Third Effect Brine Steam Separator |
| 10 | Condenser |
| 11 | Product Heat Recovery Heat Exchanger |
| 12 | Product Flash Tank |
| 13 | Internal Combustion Engine |
| 14 | Air Cooler |
| 15 | Electric Generator |
| 16 | Electric Heater coil |
| 17 a/b | Brine Transfer Pump/Brine Feed Pump |
| 18 | Oil-Brine Separator Heater Coil |
| 19 | Oil Return Control Valve |
| 20 | Engine Coolant Three-Way Valve |
| 21 | Engine Exhaust Damper Control |
| 22 | Heat Transfer Fluid Circulating Pump |
| 23 a/b/c | Pressure Regulating Valve |
| 24 a/b/c/d | Liquid Level Control Valve |
| 25 a/b/c | Back Pressure Control Valve |
| 26 a/b/c/d/e | Liquid Level Controller |
| 27 | Expansion Tank |
| 28 | Air Separator/Vent |
| 29 | Temperature Controller |

A. Brine Preparation

With reference now to FIGS. 1 and 2, in one specific though non-limiting embodiment production water is transferred by Brine Transfer Pump (17a) from an Oil-Brine Separation/Storage Tank (1) to an Oil-Brine Two-Phase Separator Drum (2). In the representative embodiment depicted herein, Oil-Brine Two-Phase Separator Drum (2) separates residual oil from the brine using a plurality of coalescer elements. The oily brine is then heated by an Oil-Brine Separator Heater Coil (18).

Heating the oily brine enhances the separation of oil from brine. The coalescer elements in Oil-Brine Two-Phase Separator Drum (2) coalesces minute particles of oil into larger particle and float, thereby separating it from the brine. The quantity of oil after the coalescing process is determined in large part by Liquid Level Controller (26a), which opens an Oil Return Control Valve (19) if a predetermined quantity of oil level is detected and deemed sufficient to be returned to Oil-Brine Separation/Storage Tank (1).

In a further embodiment, heat energy used to heat the brine in Oil-Brine Two-Phase Separator Drum (2) is derived from heat recovered from an Internal Combustion Engine (13) jacket cooling system. An engine pump circulates coolant to Oil-Brine Separator Heater Coil (18), thereby dissipating heat to the brine disposed in the Oil-Brine Two-Phase Separator Drum (2), which necessarily raises the temperature of the brine.

In one embodiment, an Engine Coolant Three-Way Valve (20) controls the temperature of the coolant entering the Internal Combustion Engine jacket cooling system by means of a Temperature Controller (29). The Engine Coolant Three Way Valve (20) port going to Oil-Brine Separator Heater Coil (18) is normally open, and the port towards Air Cooler (14) is normally closed.

When the temperature of the coolant coming back from Oil-Brine Separator Heater Coil (18) at the inlet of the Internal Combustion Engine is higher than the set point of the Temperature Controller (29), coolant is diverted to an Air Cooler (14) in order to vent heat to the atmosphere. In certain embodiments, the Air Cooler (14) fan only operates when heat from the Internal Combustion Engine jacket cooling system is more than the heating requirement of the oily brine in the Oil-Brine Two-Phase Separator Drum (2); otherwise, the fan is turned off.

B. Pre-Heating by Process Heat Recovery

In other embodiments, the feed brine is pre-heated with heat recovered from the process. The separated brine from the Oil-Brine Two-Phase Separator Drum (2) is fed to the system by Brine Feed Pump (17b). The brine passes to the Air Separator/Vent (28), where air is vented to the atmosphere. The brine is degassed from this air separator. The brine is pre-heated to a higher temperature after passing through the Condenser (10), and then further heated to a higher temperature with heat recovered from Product Heat Recovery Heat Exchanger (11).

C. Production of Heat Energy for Evaporation

In other embodiments, the heat energy required for evaporation of the single steam from the First Effect Evaporator/Heat Exchanger (4) is supplied by Exhaust Heat Recovery Heat Exchanger (3) and Electric Heater (16) via heat transfer of fluid circulated by Heat Transfer Fluid Circulating Pump (22). The heat energy from heat Exhaust Heat Recovery Heat Exchanger (3) is the heat recovered from the exhaust gas of the Internal Combustion Engine (13). In other embodiments, the electric energy supplied to Heater Coil (16) is the electric energy produced by the Electric Generator (15). In this embodiment, the heat energy from both sources is needed to maximize the use of Engine-Generator set (13) and (15).

In further embodiments, the heat energy from Exhaust Heat Recovery Heat Exchanger (3) is controlled by Engine Exhaust Damper Control (21). This Engine Exhaust Damper Control (21) modulates to meet the energy requirement of Exhaust Heat Recovery Heat Exchanger (3). The Electric Heater (16) is controlled by its own temperature controller. Both energy sources (3) and (16) are monitored and controlled by the thermal controller of First Effect Evaporator/Heat Exchanger (4).

In still further embodiments, the heat transfer loop is a closed loop using high temperature oil heat transfer fluid. The heating loop is provided with Expansion Tank (27) to protect the system from high pressure due to expansion of the heat transfer fluid inside the piping and equipment in the loop when the system is subjected to different and varying temperatures.

D. Producing a First Steam in the First Effect Evaporator/Heat Exchanger

In other embodiments, a First Steam is produced in the First Effect Evaporator/Heat Exchanger (4). The heat energy as described above in Paragraph C (regarding Heat Energy for Evaporation), and is used to evaporate some of the water from the feed brine which was pre-heated as described in paragraph B (regarding Pre-Heating by Process Heat Recovery). In the depicted embodiments, the brine leaves First Effect Evaporator/Heat Exchanger (4) in two-phases (steam and brine). The mixture is then piped to the First Effect Brine Steam Separator (5) where the steam is separated from the brine. Subsequently, the steam is extracted from the top of the vessel of First Effect Brine Steam Separator (5) and brine exits at the bottom.

The pressure of the brine supplied to this stage is controlled by Pressure Regulating Valve (23a). The Pressure Regulating Valve (23a) pressure setting is set to the design pressure. This set pressure is higher than the pressure in the next stage. This set pressure also determines the steam saturation temperature of this stage. During operation, the steam pressure in this stage is controlled by the Back Pressure Control Valve (25a) located in the drip leg of Second Effect Evaporator/Heat Exchanger (6).

The liquid level of waste brine in First Effect Brine Steam Separator (5) is controlled by Liquid Level Controller (26b) that opens and closes the Liquid Level Control Valve (24a). The waste is collected in the waste header that mixes the waste from other waste legs.

E. Producing a Second Steam and First Distillate in Second Effect Heat Exchanger In further embodiments still, the First Steam produced by the First Effect Evaporator/Heat Exchanger (4) via First Effect Brine Steam Separator (5) is piped to Second Effect Evaporator/Heat Exchanger (6). The steam in the hot side of the Second Effect Evaporator/Heat Exchanger (6) condenses, thereby transferring the heat energy to the brine on the cold side of the heat exchanger. This process evaporates some of the water from the feed brine which was pre-heated as described in paragraph B (regarding Pre-Heating by Process Heat Recovery).

The brine then leaves Second Effect Evaporator/Heat Exchanger (6) in two-phases (steam and brine). This mixture is piped to the Second Effect Brine Steam Separator (7), where the steam is separated from the brine. Again, the steam is extracted from the top of the vessel of Second Effect Brine Steam Separator (7), and brine exits at the bottom.

In alternative embodiments, the pressure of the brine supplied to this stage is controlled by Pressure Regulating Valve (23b). In the depicted embodiment, the valve pressure setting is set to the stage design pressure. This set pressure is lower than previous stage but higher than the pressure in the next stage. This set pressure also determines the steam saturation temperature of this stage. During operations the steam pressure in this stage is controlled by the Back Pressure Control Valve (25b) located in the drip leg of Third Effect Evaporator/Heat Exchanger (8).

The liquid level of waste brine in Second Effect Brine Steam Separator (7) is controlled by Liquid Level Controller (26c), which opens and closes the Liquid Level Control Valve (24b). The waste is collected in the waste header that mixes the waste from other waste legs.

The First Distillate produced in this stage is controlled by the Back Pressure Control Valve (25a) located in the drip leg of Second Effect Evaporator/Heat Exchanger (6), and the drip is collected in a header that mixes the distillate from other drip legs.

F. Producing a Third Steam and Second Distillate in a Third Effect Heat Exchanger In further embodiments, the steam produced by the Second Effect Evaporator/Heat Exchanger (6) via Second Effect Brine Steam Separator (7) is piped to Third Effect Evaporator/Heat Exchanger (8). The steam in the hot side of the Third Effect Evaporator/Heat Exchanger (8) condenses, thereby transferring the heat energy to the brine on the cold side of the heat exchanger. The process evaporates some of the water from the feed brine which was pre-heated as described in paragraph B (regarding Pre-Heating by Process Heat Recovery). The brine leaves Third Effect Evaporator/Heat Exchanger (8) in two-phase (steam and brine). The mixture is piped to the Third Effect Brine Steam Separator (9) where the steam is separated from the brine. The steam is extracted from the top of the Third Effect Brine Steam Separator (9) and brine exits at the bottom.

The pressure of the brine supplied to this stage is controlled by Pressure Regulating Valve (23c). This valve pressure setting is set to the stage design pressure. This set pressure is lower than previous stage. This set pressure also determines the steam saturation temperature of this stage. During operations the steam pressure in this stage is controlled by the Back Pressure Control Valve (25c) located in the drip leg of Condenser (10).

In this embodiment, the waste liquid level of brine in Third Effect Brine Steam Separator (9) is controlled by Liquid Level Controller (26d), which opens and closes the Liquid Level Control Valve (24c). The waste is collected in the waste header that mixes the waste from other waste legs, and is then piped to a waste storage tank.

The Second Distillate produced in this stage is controlled by the Back Pressure Control Valve (25b) located in the drip leg of Third Effect Evaporator/Heat Exchanger (8), and again the drip is collected in header that mixes the distillate from other drip legs.

G. Producing a Third Distillate and Process Heat Recovery in a Condenser

In other embodiments, the Steam produced by the Third Effect Evaporator/Heat Exchanger (8) via Third Effect Brine Steam Separator (9) is piped to Condenser (10). The steam in the hot side of the Condenser (10) condenses transferring the heat energy to the brine on the cold side of the heat exchanger and, in the process, heating feed brine coming from the Air Separator/Vent (28). The brine inlet temperature is lower that the steam saturation temperature. The brine leaves Condenser (10) at higher temperature.

The Third Distillate produced in this stage is controlled by the Back Pressure Control Valve (25c) located in the drip leg of Condenser (10), and the drip is collected in header that mixes with the distillate from other drip legs.

H. Process Heat Recovery in Product Heat Recovery Heat Exchanger

In still further embodiments, the drips collected from the drip legs and piped to Product Flash Tank (12). The Distillate being at high pressure and temperature will flash and produce steam as it enters Product Flash Tank (12) at lower pressure. The flashed steam is extracted and piped to Condenser (10) and condenses with the steam from Third Effect Brine Steam Separator (9).

The Distillate from Product Flash Tank (12) is piped to Product Heat Recovery Heat Exchanger (11). This serves as a hot fluid, and the brine from Condenser (10) serves as the cold fluid. The feed brine leaves the Product Heat Recovery Heat Exchanger (11) at a higher temperature passing through the final stage of pre-heating, thereby optimizing the heat recovery process of the system. The cooler Distillate leaving the Product Heat Recovery Heat Exchanger (11) will be piped to a product storage tank.

Figure 3:
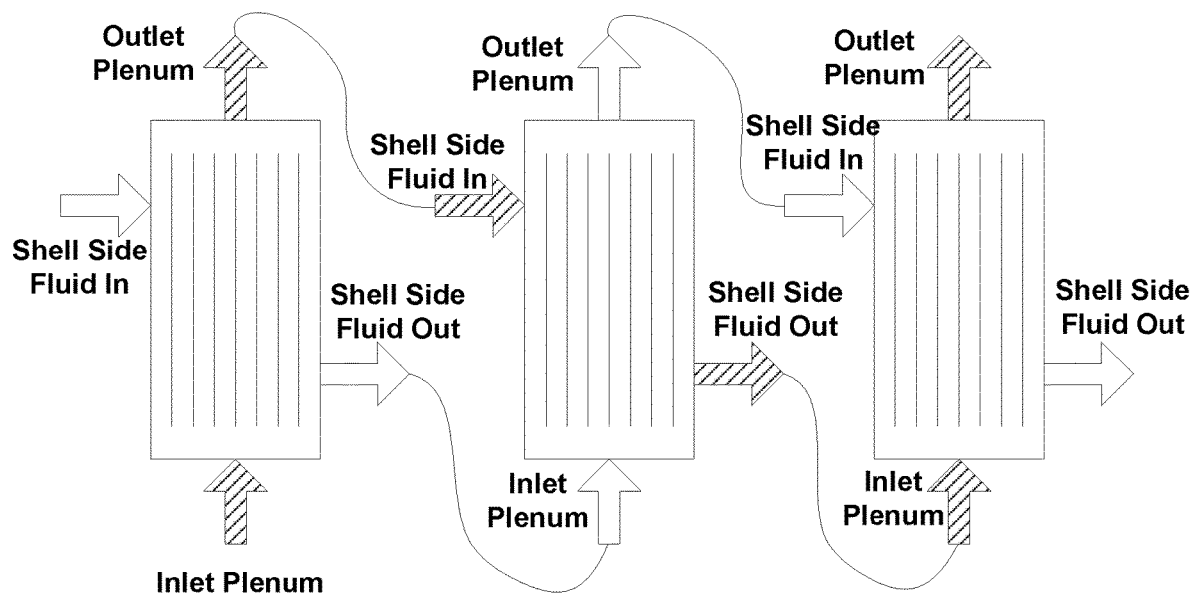
FIG. 3 is a block diagram representation of heat exchangers plumbed in a reciprocal heat transfer and recovery configuration in accordance with an embodiment of the present disclosure.

FIG. 3 is a block diagram representation of heat exchangers plumbed in a reciprocal heat transfer and recovery configuration in accordance with an embodiment of the present disclosure. The exemplary system embodiment for brine water desalinization includes a first heat exchanger having an inlet plenum and an outlet plenum for a first fluid comprising a concentrate in a liquid. The first heat exchanger includes a shell side fluid inlet and a shell side fluid outlet for a second fluid comprising a higher concentrated liquid than the first fluid. The system also comprises pipes configured to direct the first fluid from the outlet plenum to a shell side fluid inlet of a second heat exchanger and to direct the second fluid from the shell side fluid outlet to an inlet plenum of the second heat exchanger. The system further includes pipes configured to produce a desalinized water by a serial distillation of multiple steams from an nth number of heat exchangers into respective distillates thereof and a parallel product of brine waste thereof from the heat exchangers. A reciprocal heat exchange occurs from rotating the first fluid and the second fluid across the heat exchanger tubes or coils of subsequent heat exchangers. The reciprocal heat exchange avoids wasting heat by recycling the brine water in increasingly higher brine concentrations and higher heat gradients.

Figure 4:
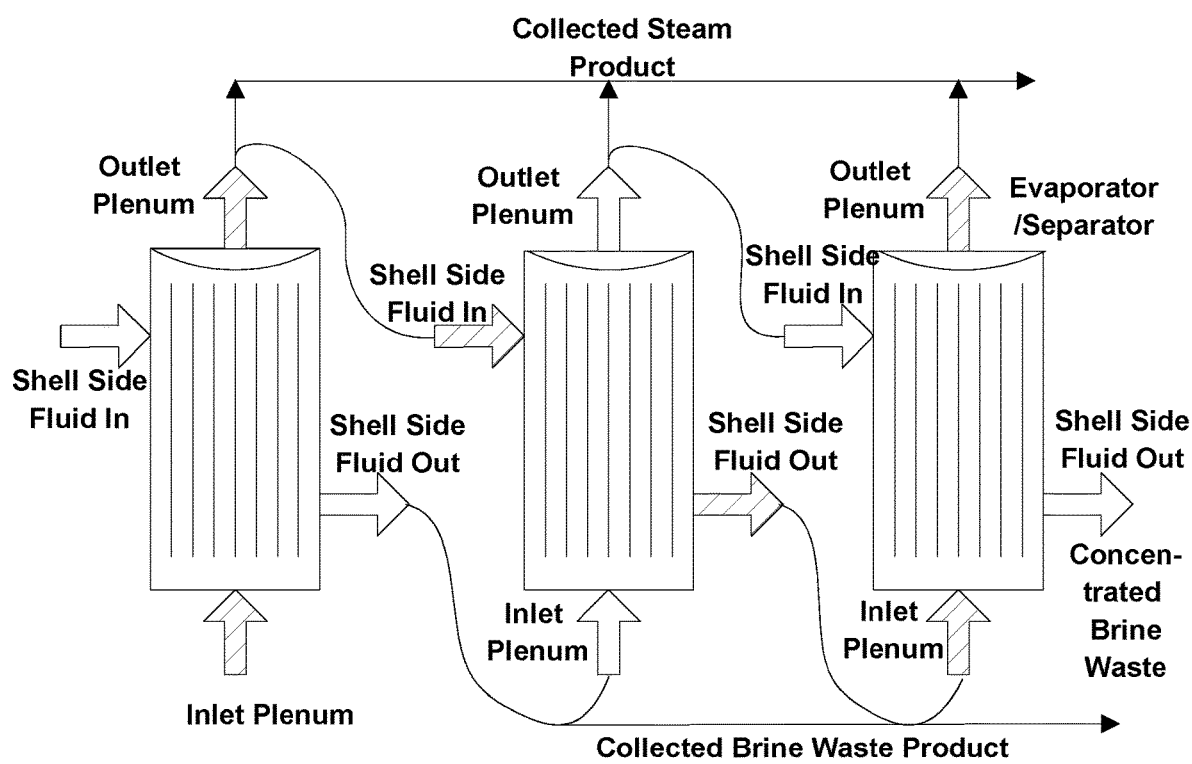
FIG. 4 is a is a block diagram representation of evaporators and heat exchangers plumbed in a reciprocal heat transfer recovery configuration in accordance with an embodiment of the present disclosure.

FIG. 4 is a is a block diagram representation of evaporators and heat exchangers plumbed in a reciprocal heat transfer recovery configuration in accordance with an embodiment of the present disclosure. Components and connections are depicted which are similar to the depiction(s) in other disclosed figures with the addition of evaporators located in the top of the flow from the inlet fluid plenum to the outlet fluid plenum. The evaporators separate a steam from the first fluid or the second fluid. The evaporators may be placed in the system in place of brine water separators or in addition thereof. The reciprocal heat exchange also avoids contamination of the desalinized water because brine is passed on both sides of the heat exchanger coils and tubes. Conventional systems typically use an emulsified oil for heat transfer that can leak and contaminate desalinized water in the tubes or coils. The resulting steam may be collected rather than reintroduced into the fluid in the system.

Figure 5:
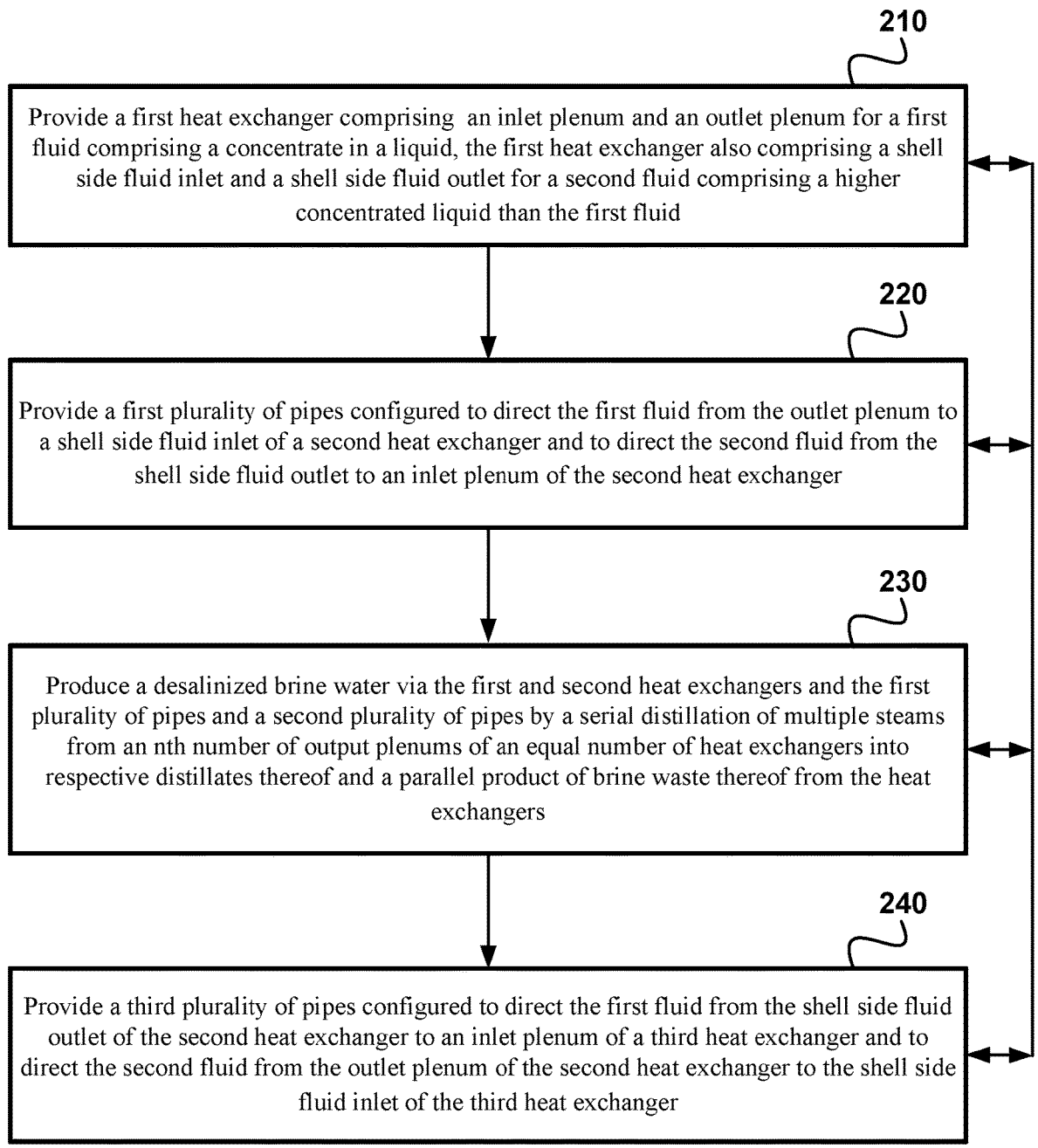
FIG. 5 is a flow chart of a method for brine water desalinization including reciprocal heat transfer or exchange and recovery in accordance with an embodiment of the present disclosure.

FIG. 5 is a flow chart of a method for brine water desalinization including reciprocal heat transfer or exchange and recovery in accordance with an embodiment of the present disclosure. The method includes providing 210 a first heat exchanger comprising an inlet plenum and an outlet plenum for a first fluid comprising a concentrate in a liquid, the first heat exchanger also comprising a shell side fluid inlet and a shell side fluid outlet for a second fluid comprising a higher concentrated liquid than the first fluid. The method also includes providing 220 a first plurality of pipes configured to direct the first fluid from the outlet plenum to a shell side fluid inlet of a second heat exchanger and to direct the second fluid from the shell side fluid outlet to an inlet plenum of the second heat exchanger. The method additionally includes producing 230 a desalinized brine water via the first and second heat exchangers and the first plurality of pipes and a second plurality of pipes by a serial distillation of multiple steams from an nth number of output plenums of an equal number of heat exchangers into respective distillates thereof and a parallel product of brine waste thereof from the heat exchangers. The method further includes providing 240 providing a third plurality of pipes configured to direct the first fluid from the shell side fluid outlet of the second heat exchanger to an inlet plenum of a third heat exchanger and to direct the second fluid from the outlet plenum of the second heat exchanger to the shell side fluid inlet of the third heat exchanger.

In an embodiment of the disclosure, the problem associated with higher concentration to the next evaporator may be avoided by providing parallel feed to the evaporators as well as additional pumps as described in a counter flow system using pumps. Heat recovery for pre-heating the feed brine is obtained by providing a heat exchanger as discussed above.

The disclosed system is modular. The water thus processed is in many cases suitable for immediate re use for the oilfield-related purposes enumerated above—which represents a significant savings of not only the expense of water acquisition and/or disposal, but also serves to conserve a valuable and increasingly precious natural resource. The water can be reprocessed by an additional like module or further processed by other suitable methods to permit its use for non-oilfield purposes, including disposal to local surface aquifers, agricultural irrigation, animal husbandry, etc. The disclosed system thus provides an efficient, modular, transportable processing unit for purifying oilfield produced water, with beneficial operator, transport and maintenance attributes.

An embodiment of the present disclosure uses con-current flow rather than a con-current flow process and system. In the counter flow, a pump is required to push the brine from lower pressure to higher pressure on the next stage, thus increasing the number of equipment components and system complexity.

The present disclosure also avoids the problem associated with higher concentration to the next evaporator by providing parallel feed to the evaporators as well as additional pumps as described in counter flow above. Heat recovery on the product for pre-heating the feed brine is obtained by providing a heat exchanger.

Additionally, the invention uses the novel idea waste heat recovery from internal combustion engine exhaust and jacket cooling water. The invention utilizes the heat energy of the fuel feed to the system to maximum efficiency. Compared to ordinary engine where heat utilization is approximately 30% this invention system utilization is over 90%.

The method of desalination of the present disclosure could well be applied using other sources of waste heat and low grade heat, i.e., gas turbine exhaust, biomass, energy from waste, etc. The application of this invention is not limited only to oily brine water but also to brackish water, sea water desalination, and waste treatment plant water distillation. Furthermore, oil recovery from the oily brine feed may be accomplished via techniques in the oil-brine separation art.

An embodiment of the present disclosure may include a plurality of Heat Exchangers, plurality of pumps, plurality of tanks, plurality of control valves, plurality of electric heater, Internal Combustion Engine, Electric Generator, air cooler, and a plurality of exhaust dampers.

Therefore, the present disclosure is unique with respect to the following applications on a larger scale; 1) Maximum utilization of fuel heating value of the fuel used in the internal combustion engine. 2) Modularization: It is modular and can be transfer and can be transported easily. 3) Energy Efficiency: Using parallel feed in MED is more energy efficient. 4) Adaptability to combine source of energy: It can be easily hooked-up to any heat source, solar collectors, municipal waste heat, and other sources of process waste heat. 5) Expandability: It can be expanded by adding components to produce other products, ie. sea salt, gypsum, lithium, fertilizer and other substance present in the feed water. 6) Scalable. It can be tailored for specific capacity requirements. 7) Can be combined with power systems to produce Desalinated water and Power. 8) Extra energy could be utilized for cooling or heating.

In other words, the present disclosure is modular, scalable, energy efficient, flexible for use with other source of energy and/or in combination of, add-ons can easily be provided to produce other products other than desalinated water.

The foregoing description is intended primarily for illustrative purposes, and is not intended to include all possible aspects of the present invention. Moreover, while the invention has been shown and described with respect to a presently preferred embodiment, those of ordinary skill in the art will appreciate that the description, and various other modifications, omissions and additions, so long as in the general form and detail, may be made without departing from either the spirit or scope thereof.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A system for brine water desalinization, comprising:
a first reciprocal heat exchanger and evaporator (RHEE) comprising an inlet plenum and an outlet plenum and tube coils there between for a first fluid comprising a concentrate in a liquid, the first reciprocal heat exchanger and evaporator also comprising a shell side fluid inlet and a shell side fluid outlet surrounding the tube coils for a second fluid comprising a higher concentrated liquid than the first fluid, wherein a first reciprocal heat exchange and evaporative distillation takes place between the first fluid in the tube coils and the second fluid in the shell side surrounding the tube coils;
a first plurality of pipes configured to rotate the first fluid from the outlet plenum to a shell side fluid inlet of a second RHEE to rotate the second fluid from the shell side fluid outlet to an inlet plenum of the second RHEE; and
a second plurality of pipes configured to produce a desalinized brine water by a serial evaporative distillation of the fluids from the output plenums of each of the RHEE into distillates thereof and a parallel product of brine waste thereof.

2. The system for brine water desalinization of claim 1, further comprising a third plurality of pipes configured to rotate the first fluid from the shell side fluid outlet of the second RHEE to an inlet plenum of a third RHEE and to rotate the second fluid from the outlet plenum of the second RHEE to the shell side fluid inlet of the third RHEE.

3. The system for brine water desalinization of claim 1, wherein the first RHEE further comprises the evaporator placed at a top of the first heat exchanger configured to produce a first steam and condensate from a fluid exiting the outlet plenum.

4. The system for brine water desalinization of claim 1, further comprising a first brine steam separator configured to take a first steam from the first fluid at the outlet plenum of the first RHEE and separate it from brine water droplets and pass the first steam into the shell side fluid inlet of the second RHEE.

5. The system for brine water desalinization of claim, 1 further comprising a heater for the first RHEE, the heater configured to heat the first and the second fluids via electrical resistive heat or solar heated water circulation.

6. The system for brine water desalinization of claim 1, further comprising a plurality of pipes configured to collect steam from one of an evaporator in the first RHEE and from a steam separator outside the first RHEE.

7. The system for brine water desalinization of claim 1, wherein an nth number of RHEE in the system is nominally three to six inclusive of the first and the second RHEE.

8. The system for brine water desalinization of claim 1, wherein the first fluid and the second fluids are a salinized brine water of various concentrations.

9. The system for brine water desalinization of claim 1, further comprising a float mechanism adapted to add more brine water to the first fluid or to the second fluid depending on a level requirement in the system.

10. The system for brine water desalinization of claim 1, further comprising a heated brine storage tank configured to provide a preheated brine to the RHEE.

11. The system for brine water desalinization of claim 1, further comprising an exhaust heat recovery heat exchanger in communication with an electric heater, a high temperature heat transfer fluid, a heat transfer fluid circulation pump, and a first effect heat exchanger.

12. The system for brine water desalinization of claim 1, further comprising:
   an oil-brine water storage and separation tank;
   an oil-brine water transfer pump;
   an oil-brine two-phase separator drum; and
   an oil-brine separator heating coil.

13. The system for brine water desalinization of claim 1, further comprising:
   a brine feed pump;
   a first air separator;
   a condenser; and
   a product heat recovery heat exchanger.

14. The system for brine water desalinization of claim 1, further comprising:
   an exhaust heat recovery heat exchanger;
   an electric heater;
   a heat transfer fluid circulation pump; and
   a first effect heat exchanger.

15. The system for brine water desalinization of claim 1, further comprising:
   a brine feed pump;
   a first effect heat exchanger;
   a first effect brine steam separator, wherein said first effect brine steam separator further comprises a first liquid level controller and a first liquid level control valve; and
   a first pressure regulating valve.

16. The system for brine water desalinization of claim 1, further comprising:
   a brine feed pump;
   a second effect heat exchanger disposed in communication with a first back pressure control valve;
   a second effect brine steam separator, wherein said second effect steam separator further comprises a second liquid level controller and a second liquid level control valve; and
   a second pressure regulating valve.

17. A method for brine water desalinization, comprising:
   providing a first RHEE comprising an inlet plenum and an outlet plenum and tube coils there between for a first fluid comprising a concentrate in a liquid, the first RHEE also comprising a shell side fluid inlet and a shell side fluid outlet surrounding the tube coils for a second fluid comprising a higher concentrated liquid than the first fluid;
   providing a first plurality of pipes configured to rotate the first fluid from the outlet plenum to a shell side fluid inlet of a second RHEE to rotate the second fluid from the shell side fluid outlet to an inlet plenum of the second RHEE; and
   producing a desalinized brine water via the first and second RHEE and the first plurality of pipes and a second plurality of pipes by a serial evaporative distillation of fluids from the output plenums of each of the RHEE into distillates thereof and a parallel product of brine waste thereof.

18. The method for brine water desalinization of claim 17, further comprising providing a third plurality of pipes configured to rotate the first fluid from the shell side fluid outlet of the second RHEE to an inlet plenum of a third RHEE to rotate the second fluid from the outlet plenum of the second RHEE to the shell side fluid inlet of the third RHEE.

19. The method for brine water desalinization of claim 17, further comprising providing a plurality of pipes configured to collect steam from one of an evaporator in the first RHEE and from a steam separator outside the first RHEE.

20. The method for brine water desalinization of claim 17, comprising an oil-brine separation/storage tank in communication with an oil-brine two phase separator drum, and a component configured for pre-heating an incoming brine as a heat exchange fluid of a recovery heat exchanger/condenser which recovers heat from the desalinized brine.

* * * * *